W. McALLISTER.
Pressing Cheese.
No. 29,899.  Patented Sept. 4, 1860.
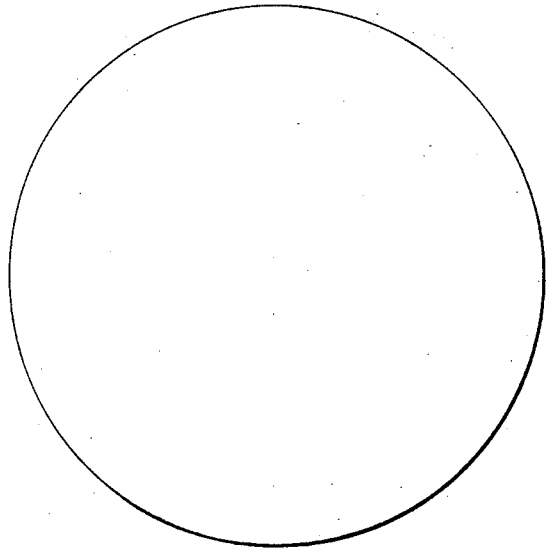
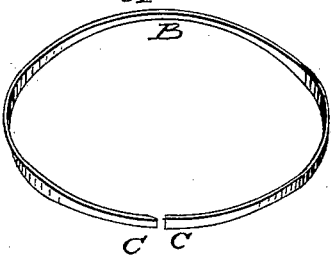
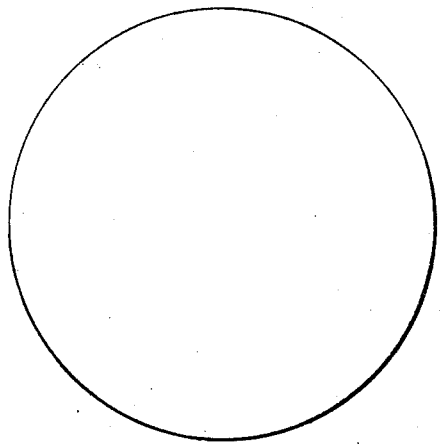
Witnesses
Obed Edson
John McAllister Jr.
Inventor
W M McAllister

UNITED STATES PATENT OFFICE.

WILLIAM McALLISTER, OF GERRY, NEW YORK.

PRESSING CHEESE.

Specification of Letters Patent No. 29,899, dated September 4, 1860.

*To all whom it may concern:*

Be it known that I, WM. McALLISTER, of Gerry, in the county of Chautauqua and State of New York, have invented a new and useful Improvement in Pressing Cheese; and I do declare that the following is a full and exact description thereof, reference being had to the accompanying drawings and to the letters of reference marked thereon.

The nature of my invention consists in what I term a crevice-hoop, which is placed around the upper corner of the cheese under the follower, for the purpose of preventing the cheese-cloths, and band, and cheese or curd from pressing up in the crevice between the follower and the hoop; and in connection with the crevice-hoop, to use what I term head-cloths, placed at the top and bottom of the cheese, which are used instead of a large single cloth to envelop the whole cheese, as is now used in pressing.

To enable others skilled in the art to make and use my invention, I will proceed to describe the construction and mode of using the same.

I use a cheese-hoop and follower constructed in any of the usual forms. Then I construct a crevice-hoop, as represented by Figure I, in the accompanying drawing, which may be made of wood or any other material appropriate for the purpose, and which I make about three-fourths of an inch in width, and the upper edge of sufficient thickness to cover the crevice between the follower and the hoop, and bevel it on the inside from the upper edge A, to the lower edge B, making the lower edge as sharp as practicable; and the length I make sufficient to encircle the upper corner of the cheese and closely fit the inside of the main hoop, and lap at the ends about an inch and a half, which ends, represented at C, C, should not be fastened together, but left loose, so that the crevice-hoop may be adjustable while in use, and fit the main hoop perfectly tight. The ends C, C, I bevel to a sharp edge tapering endwise, as far as they are designed to lap, so that the lap will be the same thickness as the rest of the hoop.

To construct my head-cloths, I use a little heavier cloth than is commonly used for cheese-cloths, and cut the cloths in a circular form, as represented by Figs. II, and III, in the accompanying drawings. Four different sizes of the head-cloths may be used at different times in pressing a cheese, as will be described below. When the curd is put in the hoop for the first pressing, I use a cloth for the bottom of the hoop of sufficient size to cover the bottom of the cheese and extend up the inside of the hoop about three inches, and the one for the top of a size to cover the top of the cheese and extend down the inside of the hoop about four inches.

The bottom head-cloth I place at the bottom of the hoop, minding as the cord is put in, that the upright edge of the cloth is kept snug against the inside of the hoop until it is covered by the curd, and when complement of curd is put in, I then place the top head-cloth over the curd, and tuck the edge down smoothly between the curd and the inside of the hoop. If necessary, I then crowd the crevice-hoop snugly in between the cloth and the inside of the hoop around the top edge of the curd. The follower is then put on for pressing; but, if the follower fits properly, it will not generally be necessary to use the crevice-hoop when the curd is put into the hoop for the first pressing.

When the cheese is ready for turning, I take off the hoop and top cloth, turn down the edge of the bottom cloth, and place a cloth for the bottom, over the top of the cheese, then place the hoop over the cloth, crowding it on to the cheese, then turn the cheese and hoop over together, and crowd the cheese down to the bottom of the hoop. A top head-cloth I then put on, which is not now required, (by the aid of the crevice-hoop to confine it in its place,) to extend down the circular side of the cheese more than two inches, which is more convenient to tuck down than the large cloth used when the curd was first put in the hoop. The crevice-hoop I then put in over the cloth, the main hoop being a trifle the smallest at the bottom. When the cheese is turned it thereby leaves a space at the upper corner of the cheese sufficient to crowd the crevice-hoop in conveniently. The follower is then put on for pressing.

When I press the band on the cheese—which I generally do—after the band is put on, and a head cloth for the bottom put over the band, and hoop put on and cheese and hoop turned over as before described, I then put my smallest head-cloth on the top of the cheese, which should not extend down over the circular side of the cheese more than about one inch, thereby leaving less folds to print the cheese than a large cloth. Then put on the crevice-hoop, which will confine the edge of the cloth in its proper place; the follower being put on the cheese is then ready for pressing. The crevice hoop may be used at the bottom as well as the top of the cheese; but I have generally found it unnecessary. The bottom of the main hoop being a trifle smaller than the top, and for other reasons the curd appears to hold the bottom head-cloth in its place without the aid of the crevice-hoop; also it may be used in connection with the large single cheese-cloths now in use, in case the follower does not fit sufficiently tight.

By the use of the crevice-hoop, the corners of the cheese will be kept smooth, leaving no trimmings to be taken off; and when the band is pressed on it prevents the corners of the cheese and band from pressing into the crevice, thereby preventing the corners of the cheese from becoming doubled over, broken and rough in turning the cheese while curing.

My head-cloths are preferable to the large single cheese-cloths now in use, on account of requiring much less cloth, are cheaper, and much more convenient to wash and to use, and the folds are not as bad to crease the cheese.

What I claim as my invention, and desire to secure by Letters Patent, is—

1. The application and use of the crevice-hoop Fig. I, constructed and used as and for the purposes specified.

2. The application and use of the head-cloths specified, the same being made and used as and for the purposes described.

WM. McALLISTER.

Witnesses:
OBED EDSON,
JOHN McALLISTER, Jr.